United States Patent [19]
Sublette et al.

[11] Patent Number: 5,269,929
[45] Date of Patent: Dec. 14, 1993

[54] MICROBIAL PROCESS FOR THE REDUCTION OF SULFUR DIOXIDE

[75] Inventors: Kerry L. Sublette, Tulsa, Okla.; Badri N. Dasu, Sunnyvale, Calif.

[73] Assignee: ABB Environmental Services Inc., Portland, Me.

[21] Appl. No.: 972,983

[22] Filed: Nov. 10, 1992

Related U.S. Application Data

[63] Continuation-in-part of Ser. No. 193,460, May 13, 1988, abandoned.

[51] Int. Cl.$^5$ ............................................. C02F 3/34
[52] U.S. Cl. ................................. 210/610; 423/242.2; 435/266
[58] Field of Search ............... 210/603, 610, 611, 631; 435/42, 266; 423/242

[56] References Cited

U.S. PATENT DOCUMENTS

| | | | |
|---|---|---|---|
| 4,242,448 | 12/1980 | Brown, III | 435/266 |
| 4,519,912 | 5/1985 | Kauffman et al. | 210/611 |
| 4,584,271 | 4/1986 | Stern et al. | 210/611 |
| 4,614,588 | 9/1986 | Li | 210/611 |
| 4,620,928 | 11/1986 | Gött | 210/603 |
| 4,735,723 | 4/1988 | Mulder | 210/603 |
| 4,789,478 | 12/1988 | Revis et al. | 210/611 |

*Primary Examiner*—Thomas Wyse
*Attorney, Agent, or Firm*—Chilton, Alix & Van Kirk

[57] ABSTRACT

A biological process is described involving the conversion of $SO_2$ to $H_2S$ using sulfate reducing bacteria in co-culture with facultatively anaerobic heterotrophs under anaerobic conditions in a maintenance medium which includes a substrate fermentable by the facultatively anaerobic heterotrophs to produce an end product which acts as the carbon and energy source for the sulfate reducing bacteria. Glucose and sewage sludge are the two fermentable substrates described. The process is described as being used in conjunction with a process for removing $SO_2$ from a flue gas and then converting the $SO_2$ to $H_2S$. The $H_2S$ may be reacted with some remaining $SO_2$ in a Claus reactor to produce elemental sulfur or the $H_2S$ may be used as a reducing gas to regenerate the sorbent being used to remove the $SO_2$ from the flue gas.

2 Claims, 1 Drawing Sheet

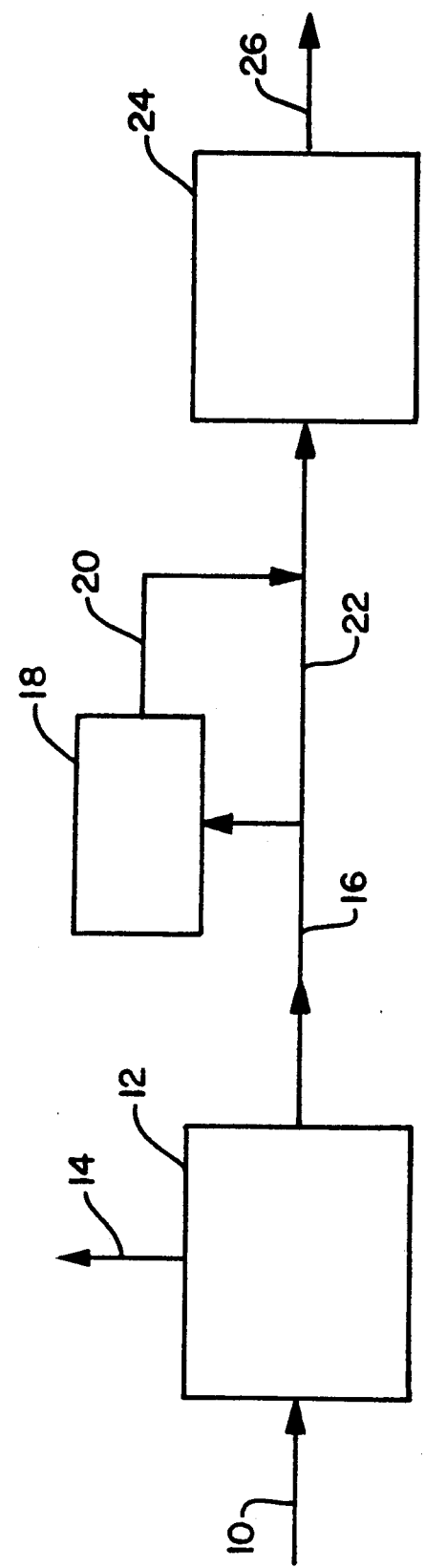

MICROBIAL PROCESS FOR THE REDUCTION OF SULFUR DIOXIDE

BACKGROUND OF THE INVENTION

This application is a continuation-in-part of application Ser. No. 07/193,460 filed May 13, 1988, now abandoned. With the continual increase in the utilization of high sulfur fossil fuels (particularly coal and sour petroleum crudes), the release of airborne sulfur dioxide into the environment has become a critical problem. Upon release into the atmosphere, $SO_2$ may react photochemically or catalytically with other atmospheric contaminants to form sulfur trioxide, sulfuric acid and various salts of sulfuric acid which form the chief constituents of acid precipitation, also known as acid rain.

Rain normally has a pH of approximately 5.7 as a result of the formation of carbonic acid from atmospheric carbon dioxide. However, due to the formation of stronger acids resulting from $SO_2$ emissions, pH values of 3.5-4.5 or lower have been recorded in the U.S., Canada and Europe. In other words, precipitation in affected areas has been found to be 10-100 times more acidic than the geologic average. The effects of acid rain on ecosystems is a major concern. These effects have been reported to include increased leaching of nutrients from plant foliage and soil, interference with decomposition processes, and disruption of the nitrogen cycle. In addition to damage to ecosystems, acid rain causes major damage to materials such as metals, limestone, marble and mortar. Sulfur doixide and related pollutants in the atmosphere have also been linked to various categories of human diseases.

A major concern is the large amounts of $SO_2$ emitted, especially in metropolitan areas where power generation plants are concentrated.

There are several engineering solutions to this problem, although none alone satisfy all of the desired technical and economic requirements. There are two basic approaches to addressing the problem of $SO_2$ emissions: (1) desulfurize the feedstock prior to or during combustion; or (2) scrub the resultant $SO_2$ from the boiler flue gases. Although feedstock desulfurization and allied technologies (e.g., coal liquefaction) are of considerable interest, it is the flue gas processing alternative which will be addressed here.

The most commercially important flue gas desulfurization technology at present is the use of solid, throwaway adsorbents such as limestones and dolomites which have affinity for acid gases like $SO_2$. This type of process results in the production of large amounts of calcium sulfate which can represent a significant disposal problem. In addition, little or no $NO_x$ removal is achieved.

Several of the more promising technologies under development combine $SO_2$ and the removal of oxides of nitrogen ($NO_x$). These include radiation-initiated processes, low temperature dry scrubbing and regenerable dry scrubbing. The irradiation of flue gases with electron beams or microwaves can result in the oxidation of $SO_2$ and $NO_2$ to their respective acids under the proper conditions of temperature and moisture. The process requires the addition of large quantities of ammonia to retard the formation of corrosive sulfuric acid. The oxidation products are recovered as ammonium sulfate and ammonium nitrate. In low temperature dry scrubbing processes, a lime sorbent is sprayed into the flue gases at 300°-400° F. A dry waste of $CaSO_4$ and unreacted sorbent is produced. No $NO_x$ removal is obtained without additives to the sorbent. In regenerable dry scrubbing processes, as the name implies, flue gases are contacted with a dry sorbent resulting in the chemisorption of $SO_2$. The sulfated sorbent is subsequently regenerated using a reducing gas such as hydrogen, carbon monoxide or methane. As examples, the two major regenerable dry scrubbing processes under development are the copper oxide process and the NOXSO process. In the copper oxide process, $NO_x$ is catalytically reduced to elemental nitrogen with ammonia. Regeneration of the copper oxide sorbent produces a concentrated stream of sulfur dioxide. In the NOXSO process, the sorbent consists of sodium aluminate ($NaAlO_2$) on gamma alumina. The sorbent also adsorbs or chemisorbs $NO_x$ from flue gas. The $NO_x$ chemisorption product is unstable above 400° C. During regeneration, heating the sorbent in air to 600° C. produces a concentrated $NO_x$ stream. Subsequent treatment of the sorbent with a reducing gas produces a mixture of $SO_2$, $H_2S$ and elemental sulfur.

Regenerable dry scrubbing processes, such as the NOXSO or copper oxide processes, offer considerable advantage over the use of throwaway adsorbents. Primary among these are reduced costs for chemical makeup and the simultaneous removal of $SO_2$ and $NO_x$. However, both the copper oxide and NOXSO processes produce a concentrated stream of $SO_2$ or $SO_2$ and $H_2S$, respectively, which must be disposed of or recovered in a separate process. New technology is needed to process these concentrated sulfur gas streams from regenerable dry scrubbing processes to produce a usable by-product which can be easily recovered, stored and transported.

SUMMARY OF THE INVENTION

The current invention consists of a process by which a gas stream containing $SO_2$ is contacted with a culture of sulfate reducing bacteria to effect the reduction of $SO_2$ to $H_2S$. More specifically, the process culture is a non-aseptic co-culture of sulfate reducing bacteria and mixed facultatively anaerobic heterotrophs in a medium consisting of mineral salt, a source of reduced nitrogen, vitamins and a substrate which is fermentable by the mixed facultatively anaerobic heterotrophs to produce an end product which acts as the carbon and energy source (electron donor) for the sulfate reducing bacteria. In other words, there is no direct carbon and energy source for the sulfate reducing bacteria but only the indirect source from the fermentation of the substrate by the heterotrophs. The process culture is operated anaerobically in that there is no oxygen feed.

The invention is further directed to the use of this biological process for converting $SO_2$ to $H_2S$ in conjunction with a process such as the Claus process for the conversion of $H_2S$ to elemental sulfur as a means of by-product recovery from the concentrated $SO_2$ or $SO_2/H_2S$ gas streams resulting from the regeneration of the sorbent in flue gas scrubbing processes such as the copper oxide or NOXSO regenerable dry scrubbing processes. For example, the concentrated $SO_2$ stream produced by the copper oxide process can be split with two-thirds of the $SO_2$ reduced to $H_2S$ by contact with the sulfate reducing bacteria culture. The $H_2S$ thus produced can then be combined with the remaining $SO_2$ and fed to a Claus reactor to produce elemental sulfur. The process may also be used with the NOXSO process to condition the gaseous regeneration by-products of the NOXSO process ($H_2S$ and $SO_2$) to produce the specific $H_2S/SO_2$ ratio (2/1) required by a Claus reactor. Or alternately, the $SO_2$ component of the NOXSO by-product stream may be processed to yield $H_2S$ which can then be used as a reducing gas to regenerate the sorbent.

BRIEF DESCRIPTION OF THE DRAWINGS

The figure is a schematic flow diagram of one embodiment of the present invention.

DETAILED DESCRIPTION OF THE PREFERRED EMBODIMENTS

The microorganisms involved in the sulfur cycle in nature can be divided into two major nutritional categories, heterotrophs and autotrophs. Autotrophic microorganisms are those which require only carbon dioxide as a source of carbon. Heterotrophic microorganisms are capable of reducing sulfate and incorporating the reduced sulfur into cellular material. This process is termed assimilatory sulfate reduction. A few microorganisms utilize sulfate as a terminal electron acceptor under anaerobic conditions with reduction of sulfate to sulfide. The sulfide thus produced is for the most part not assimilated and accumulates external to the cells. This process is termed dissimilatory sulfate reduction and these organisms are collectively known as the sulfate reducing bacteria. Sulfate reducing bacteria belong to the genera Desulfovibrio, Desulfotomaculum, Desulfuromonas, Desulfomonas, Desulfococcus, Desulfobacter, Desulfobulbus, Desulfosarcina and Desulfonema.

The sulfate reducing bacteria are strict anaerobes. Mere exclusion of oxygen from culturing media is insufficient to promote growth. In fact redox-poising agents are required to maintain the redox potential in the range of $-150$ to $-200$ millivolts (mV). The sulfate reducing bacteria possess electron-transporting co-factors which are unstable at more positive redox potentials. These microorganisms are nutritionally limited to certain types of direct carbon and energy sources such as ethanol, lactate, pyruvate and malate. In accordance with the present invention, such direct carbon and energy sources are the end products of the anaerobic fermentation of the fermentable substrate by fermentive bacteria.

It is well known that when $SO_2$ reacts with water, a dynamic equilibrium is established between $SO_2$, sulfite ion ($SO_3^{-2}$) and bisulfite ion ($HSO_3^-$) as shown in the equation below:

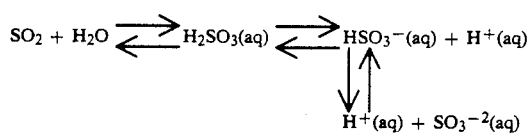

The relative proportion of the various species in solution is dependent predominantly on pH. Sulfate reducing bacteria can utilize sulfite as well as sulfate as a terminal electron acceptor to support growth. For example, cultivated Desulfovibrio with sulfite and sulfate as terminal electron acceptors may use lactate as an electron donor and carbon source. The yields of biomass per mole of electron acceptor reduced are greater for sulfite (9.2g/mole) than for sulfate (6.3 g/mole). The greater yield on sulfite has been attributed to the fact that no ATP is expended in its activation unlike sulfate.

(ATP is adenosine triphosphate, the principle carrier of chemical energy in biological systems.) These observations suggest that sulfite may be the better terminal electron acceptor for Desulfovibrio in terms of energy metabolism.

The invention will first be described with respect to a maintenance medium comprising glucose as the fermentable substrate. Desulfovibrio desulfuricans (ATCC 13541) was obtained from the American Type Culture Collection, Rockville, Md., and stock cultures were grown aseptically in complex glucose maintenance medium (Table 1) at 30° C.

TABLE 1

| COMPLEX GLUCOSE MAINTENANCE MEDIUM | |
|---|---|
| Component | g/L |
| $Na_2HPO_4$ | 1.2 |
| $KH_2PO_4$ | 1.8 |
| Peptone | 5.0 |
| Beef Extract | 3.0 |
| Yeast Extract | 0.2 |
| $MgSO_4$ | 1.5 |
| $Na_2SO_4$ | 1.5 |
| $Fe(NH_4)(SO)_4$ | 0.1 |
| Glucose | 5.0 |

Sulfate was the terminal electron acceptor and ammonium ion the source of reduced nitrogen. This medium was recommended by the ATCC although sulfate reducing bacteria for the most part cannot use glucose as a carbon and energy source. The actual carbon and energy source for D. desulfuricans in stock cultures was probably derived from the yeast extract, peptone, and beef extract.

A working culture for the reduction of $SO_2$ to $H_2S$ was prepared as follows. A fermentation vessel was filled with complex glucose medium (Table 1), inoculated with Desulfovibrio desulfuricans and grown under non-aseptic conditions at 30° C. and a pH of 7.0 for 24 hours. Cells were then harvested by centrifugation at $4900 \times g$ for 10 minutes at 30° C. The supernatant was discarded and the cells were resuspended in a glucose minimal medium described in Tables 2 and 3 with sulfate as the terminal electron acceptor.

TABLE 2

| MINIMAL GLOCUSE MAINTENANCE MEDIUM | |
|---|---|
| Component | g/l |
| $Na_2HPO_4$ | 1.2 |
| $KH_2PO_4$ | 1.8 |
| $Na_2SO_4$ | 1.5 |
| $MgCl_2.6H_2O$ | 2.9 |
| Glucose | 5.0 |
| Balch Vitamin Solution (see Table 3) | 2.0 mls |

TABLE 3

| BALCH VITAMIN SOLUTION | |
|---|---|
| Component | mg/l |
| Biotin | 2.0 |
| Folic Acid | 2.0 |
| Pyridoxine Hydrochloride | 10.0 |
| Thiamine Hydrochloride | 5.0 |
| Riboflavin | 5.0 |
| Nicotinic Acid | 5.0 |
| DL-Calcium Pantothenate | 5.0 |
| Vitamin $B_{12}$ | 0.1 |
| P-Aminobenzoic Acid | 5.0 |
| Lipoic Acid | 5.0 |

The resuspended cells were then transferred back to the fermenter and grown in this medium for another 24 hours to acclimate the cells to the minimal medium prior to the introduction of $SO_2$. At the end of this incubation, cells were once again harvested by the method described above at 30° C., then resuspended in the same minimal medium without sulfate and transferred back to the fermenter. At this point, a microscopic examination of the culture showed a collection of various gram negative and gram positive organisms which were very motile. Approximately 50% of the microorganisms in the culture were crescent shaped cells typical of Desulfovibrio.

When attempts were made to culture *D. desulfuricans* in a minimal medium (Tables 2 and 3) which utilized glucose as the sole source of carbon and energy under aseptic conditions, very little growth was observed. However, under non-aseptic conditions, in which populations of mixed heterotrophs developed in the cultures, vigorous growth of *D. desulfuricans* was observed. Working cultures containing greater than $5 \times 10^8$ cells/ml were determined by microscopic counts to be approximately 50% Desulfovibrio. This was a surprising and unexpected result. There are probably two reasons for the observed stimulation in the growth of the Desulfovibrio by the mixed heterotrophs. First, as noted above, sulfate reducing bacteria do not use carbohydrates, such as glucose, as a source of carbon and energy but are restricted to compounds such as ethanol, acetate, lactate and pyruvate. These are recognized as end products of anaerobic carbohydrate metabolism by fermentive bacteria. The fact that *D. desulfuricans* was observed to grow well in mixed culture in a medium containing only glucose as a carbon and energy source indicates beneficial cross-feeding in the culture. Apparently, the mixed heterotrophs in the culture utilized glucose and produced pyruvate, lactate, or other end products. These fermentive end products then served as carbon and energy sources for *D. desulfuricans*. Lactate could not be detected in the medium from working cultures. However, other end products may have predominated or lactate may have been utilized as fast as it was produced. Secondly, pure cultures of *D. desulfuricans* require redox-poising agents to maintain strict anaerobic conditions in the culture medium. Mere exclusion of oxygen is not sufficient. In all experiments conducted in the work described here, no redox-poising agents were used. Apparently the mixed heterotrophs in the culture scavenged all the available oxidants and thus kept the redox potential sufficiently negative to favor the growth of the Desulfovibrio.

The contribution of the heterotrophs in these cultures to the growth of *D. desulfuricans* was further evidence by efforts to do plate counts for *D. desulfuricans* on complex glucose medium agar. In all cases except one, no growth of *D. desulfuricans* was seen on any of the plates as evidenced by the absence of black colonies indicative of sulfate reducing bacteria. Colonies of sulfate reducing bacteria appear black in the presence of iron due to the precipitation of sulfide as iron sulfide. In isolated colonies, the benefits of cross-feeding between *D. desulfuricans* and mixed heterotrophs and, to some extent, oxygen scavenging by heterotrophs would be lost.

To illustrate the present invention, a bench scale operation will be described using a 2.6 liter reactor vessel. The vessel was loaded with a working culture of *D. desulfuricans* and mixed heterotrophs prepared as described above. A synthetic gas mixture (0.99% $SO_2$, 4% $CO_2$ and the balance $N_2$) was fed to the culture through a sparger at a molar flow rate of 0.78 mmoles $SO_2$/hr. Nitrogen at 270 mliters/min was also fed to the culture to strip $H_2S$. With this flow rate, $SO_2$ limiting conditions were satisfied. That is, the $SO_2$ feed rate was not in excess of the maximum specific activity of the biomass for $SO_2$ reduction. Sulfate was undetectable in the culture medium. The complete removal of the $SO_2$ from the feed gas was evidenced by the lack of $SO_2$ in the exit gases. Also, as $SO_2$ was removed, the total biomass protein concentration and the *D. desulfuricans* and total heterotrophs counts increased. Analysis of the off-gas from the reactor showed a steady concentration of $H_2S$ of around 800 ppm. No sulfide or elemental sulfur accumulated in the culture medium. The following Table 4 gives the results of three runs using gas chromatograph analysis with a detection limit of 50 ppm. Therefore, the $H_2S$ analyses may be under valued and the actual $H_2S/SO_2$ ratio may be close to 1.0. In other words, all the $SO_2$ was converted to $H_2S$.

TABLE 4

| SULFUR BALANCE | | | |
|---|---|---|---|
| | Test 1 | Test 2 | Test 3 |
| mmoles $SO_2$ consumed | 69.0 | 90.9 | 61.6 |
| mmoles $H_2S$ produced | 63.7 | 86.2 | 60.4 |
| Ratio $H_2S/SO_2$ | 0.92 | 0.95 | 0.98 |

The glucose concentration in the culture decreased with time indicating that the culture was actively utilizing glucose. Glucose addition (10 g) was required about every 24 hrs. Alkali was added as needed to maintain the pH of the culture medium at about 7.0. In the tests, alkali addition was required for approximately 10 hours after each glucose addition. Typically, 148 milliequivalents of hydroxide were used for every 10 grams of glucose required. The average ratio of moles of glucose consumed to the moles of $SO_2$ reduced is about 3.4. The average ratio of grams of biomass protein to moles $SO_2$ reduced is about 11.4 grams/mole.

The $SO_2$ feed rate in Tests 1–3 was always less than the maximum specific activity of the biomass for $SO_2$ reduction and sulfite was undetected in the culture medium. To determine the maximum feed rate, the $SO_2$ feed to working cultures developed as described above was increased to the point where sulfite began to accumulate in the liquid phase and further increases resulted in a disproportionate increase in the outlet $H_2S$ concentration. Still further increases in the $SO_2$ flow rate resulted in decreases in outlet $H_2S$ concentration and a large build-up of sulfite. On the basis of these upset conditions, it was determined that the maximum specific activity of *D. desulfuricans* for $SO_2$ reduction was 1.69 mmoles $SO_2$/hour-$10^{11}$ cells.

An alternative form of the present invention involves the use of a pretreated sewage sludge as the substrate which is fermentable by the facultatively anaerobic heterotrophs. As indicated, this fermentation produces the products which act as the carbon and energy source for the sulfate reducing bacteria.

Although initial experiments indicated that a yeast extract would support sulfate reduction, raw sewage sludge did not.

Evidently *D. desulfuricans* and the mixed heterotroph could not utilize the predominantly insoluble carbon and energy sources of the raw sewage sludge. These observations led to pretreatment of the sewage sludge to facilitate solubilization of the sludge biosolids. 100 g of wet-packed sludge was suspended in 1 liter of the following medium:

| | |
|---|---|
| Na$_2$HPO$_4$ | 8.5 mM |
| KH$_2$PO$_4$ | 13.2 mM |
| MgCl$_2$ | 7.4 mM |
| NH$_4$Cl | 3.7 mM |
| FeCl$_3$ | 0.25 mM |
| Balch vitamin solution | 2.0 mL/L |

The pH was then adjusted to 12.0 with 10N NaOH and the suspension autoclaved at 121° C. for 30 min. After cooling the pH was readjusted to 7.0 with 6N H$_3$PO$_4$. Table 5 shows the mixed liquor suspended solids (MLSS) and soluble chemical oxygen demand (COD) and protein concentrations before and after treatment of the sludge suspensions. This is an indication that the heat/alkali pretreatment solubilized a significant fraction of the sludge biosolids.

TABLE 5

| Effect of Heat/Alkali Treatment | | |
|---|---|---|
| | Before Treatment | After Treatment |
| MLSS (mg/L) | 5800 | 4370 |
| Soluble COD (mg/L) | 70 | 4400 |
| Soluble Protein (mg/L) | 24 | 550 |

A continuous SO$_2$-reducing culture with a feed of the pretreated sewage sludge was then developed. Sulfate-reducing biomass from the *D. desulfuricans* culture growing on yeast extract was harvested by centrifugation at 5000 xg and 25° C. The biomass was then resuspended in 1.5 L of a filtered preparation of pretreated sewage sludge medium described above in a fermenter. The feed for the fermenter consisted of unfiltered pretreated sewage sludge medium. The feed reservoir was chilled with ice in an insulated container to slow subsequent microbial activity which might reduce the concentration of fermentable substrates in the feed. Feed was pumped to the fermenter at a rate of 12.0 mL/hr resulting in a dilution rate of 0.19d$^{-1}$. On day 59 the volumetric feed rate was reduced to 8.0 mL/hr (0.13 d$^{-1}$) and remained at this level for the duration of the first experiment. Effluent from the fermenter was continuously removed at the culture surface which withdrew mixed liquor from the reactor as the volume increased with feed delivery.

The culture was maintained at pH 7.0 and 30° C. The agitation rate was 200 rpm. The culture received gas feeds of 308 mL/min N$_2$ to strip H$_2$S and 9.8 mL/min of 1.0% SO$_2$, 5% CO$_2$, balance N$_2$. This corresponds to a molar SO$_2$ feed rate of 0.236 mmoles/hr.

During start-up of the continuous *D. desulfuricans* SO$_2$-reducing culture with pretreated sewage sludge feed, the H$_2$S concentration in the reactor outlet gas was about 6000 ppmv after 24 hrs. This H$_2$S production was much too high to account for in terms of SO$_2$ reduction alone. Over the next 48 hours the H$_2$S concentration declined steadily until the concentration was 200-250 ppmv where it remained for the duration of the experiment. This extra H$_2$S production, over and above that produced by SO$_2$ reduction has been attributed to the metabolism by non-sulfate reducing bacteria heterotrophs of sulfur-containing substrates (probably S-containing amino acids) produced during heat/alkali treatment of sewage solids. These soluble substrates were present at very high concentrations during start-up.

During the course of the experiment, the culture was very stable with respect to SO$_2$ reduction. No upsets (as indicated by accumulation of sulfite in the culture medium) were observed and as shown in Table 6, complete reduction of SO$_2$ to H$_2$S was observed during six months of continuous operation. The culture utilized solubilized proteins and other sources of soluble COD as carbon and energy sources to support SO$_2$ reduction.

TABLE 6

Sulfur Balances in *D. desulfuricans* Continuous SO$_2$-Reducing Reactor Operated on Feed of Heat/Alkali Pretreated Sewage Sludge

| Day | SO$_2$ Feed Rate (mmoles/hr) | H$_2$S Produciton Rate (mmoles/hr) | H$_2$S/SO2 |
|---|---|---|---|
| 21 | 0.205 | 0.204 | 1.00 |
| 22 | 0.205 | 0.209 | 1.02 |
| 47 | 0.222 | 0.224 | 1.01 |
| 65 | 0.222 | 0.219 | 0.99 |
| 68 | 0.236 | 0.229 | 0.97 |
| 85 | 0.236 | 0.232 | 0.98 |

As noted above, in SO$_2$-reducing cultures of *D. desulfuricans* in which glucose served as the ultimate carbon and energy source, acetic acid and other volatile fatty acids were produced as end products of glucose metabolism by *D. desulfuricans* and the mixed heterotrophs in the culture. In the cultures described here, very little net production of carboxylic acids (<100 mg/L) was observed when solubilized sewage sludge served as the carbon and energy source.

In the second of two experiments of this type, after steady state was achieved, the SO$_2$ feed rate was increased step-wise until the specific activity of *D. desulfuricans* was exceeded as indicated by accumulation of sulfite in the culture medium. Combined with an enumeration of *D. desulfuricans* this allowed an estimation of the maximum specific activity of the organism for SO$_2$ reduction under those growth conditions.

An MPN count (in triplicate) of sulfate reducing bacteria in the process culture resulted in a count of $4.5 \times 10^7$ cells/mL. At a SO$_2$ molar feed rate of 0.50 mmoles/hr this culture (1.5 L) began to accumulate sulfite in the culture medium. Therefore the maximum specific activity for SO$_2$ reduction was 0.74 mmoles SO$_2$/hr-10$^{11}$ cells. This compares to 1.7 mmoles SO$_2$/hr-10$^{11}$ cells obtained for SO$_2$ reduction by this organism in mixed culture with glucose as the indirect carbon and energy source.

Reference will now be made to the drawings which illustrate the biological process described thus far in an overall process for treating flue gas. In FIG. 1, the flue gas 10 is fed to a conventional SO$_2$ removal process 12 such as the previously discussed copper oxide process. The treated flue gas exits the process at 14 and the concentrated SO$_2$ gas stream exits at 16. In the embodiment of the present invention which includes the use of a Claus reactor to convert SO$_2$ and H$_2$ S to elemental sulfur, two thirds of the concentrated SO$_2$ stream is fed to the bioreactor 18 in which the SO$_2$ is converted to H$_2$S as described. The H$_2$S exits the bioreactor at 20 and is mixed with the remaining one-third SO$_2$ in line 22. The two-thirds H$_2$S/one-third SO$_2$ mixture is then fed to the Claus reactor 24 in which the following reaction occurs:

$$SO_2 + 2H_2S \rightarrow 2H_2O + 3S$$

The elemental sulfur exits at 26. Of course, the Claus process is a well known process and need not be described further. Reference is made to Handbook of Natural Gas Engineering, McGraw-Hill, N.Y., 1959.

We claim:

1. A process for converting the $SO_2$ in a gas stream to $H_2S$ comprising the steps of:
   a. forming a co-culture of sulfate reducing bacteria and at least one facultatively anaerobic heterotroph in a sulfate-free culture maintenance medium devoid of a direct carbon and energy source for said sulfate reducing bacteria and containing a fermentable substrate, said fermentable substrate being fermentable by said facultatively anaerobic heterotroph to produce a carbon and energy source for said sulfate reducing bacteria;
   b. contacting said $SO_2$-containing gas stream with said co-culture under anaerobic conditions wherein the maximum amount of $SO_2$ is limited to the maximum specific activity of the sulfate reducing bacteria for $SO_2$ reduction whereby said heterotroph utilizes said substrate as a carbon and energy source and produces a carbon and energy source for said sulfate reducing bacteria and whereby $SO_2$ is reduced to $H_2S$.

2. A process as recited in claim 1 wherein said substrate is glucose.

* * * * *

UNITED STATES PATENT AND TRADEMARK OFFICE
CERTIFICATE OF CORRECTION

PATENT NO. : 5,269,929
DATED : December 14, 1993
INVENTOR(S) : Kerry L. Sublette et al It is certified that error appears in the above-indentified patent and that said Letters Patent is hereby corrected as shown below:

Claim 1, column 9, line 11, after "direct", delete ":".

Signed and Sealed this

Thirteenth Day of September, 1994

BRUCE LEHMAN

Attest:

Attesting Officer      Commissioner of Patents and Trademarks